US006178742B1

(12) United States Patent
Guyonnet et al.

(10) Patent No.: US 6,178,742 B1
(45) Date of Patent: Jan. 30, 2001

(54) REAR MIXER EJECTOR FOR A TURBOMACHINE

(75) Inventors: Xavier Jean Michel André Guyonnet, St Fargeau Ponthierry; Pascal Claude Wurniestky, Savigny le Temple, both of (FR)

(73) Assignee: Societe Nationale d'Etude et de Construction de Moteurs d'Aviation "Snecma", Paris (FR)

(*) Notice: Under 35 U.S.C. 154(b), the term of this patent shall be extended for 0 days.

(21) Appl. No.: 09/103,545

(22) Filed: Jun. 24, 1998

(30) Foreign Application Priority Data

Jun. 26, 1997 (FR) .................................................. 97 07987

(51) Int. Cl.[7] ...................................................... F02K 1/46
(52) U.S. Cl. ........................................ 60/262; 239/265.17
(58) Field of Search ........................... 60/262, 264, 39.5; 239/265.13, 265.17, 265.19; 181/213, 228, 215

(56) References Cited

U.S. PATENT DOCUMENTS

| 3,637,041 | 1/1972 | Hilbig . | |
|---|---|---|---|
| 5,154,052 | 10/1992 | Giffin, III et al. . | |
| 5,157,916 | * 10/1992 | Wynosky et al. | 60/264 |
| 5,261,229 | 11/1993 | Ford et al. . | |
| 5,291,672 | * 3/1994 | Brown | 60/262 |
| 5,727,382 | * 3/1998 | Chevalier et al. | 60/270.1 |
| 5,826,794 | * 10/1998 | Rudolph | 293/265.17 |
| 5,941,065 | * 8/1999 | Lidstone et al. | 60/262 X |

FOREIGN PATENT DOCUMENTS

| 2.126..922 | 10/1972 | (FR) . |
|---|---|---|
| 2 661 715 | 11/1991 | (FR) . |
| 874496 | 8/1961 | (GB) . |
| WO 93/22552 | 11/1993 | (WO) . |

* cited by examiner

Primary Examiner—Timothy S. Thorpe
Assistant Examiner—David J. Torrente
(74) Attorney, Agent, or Firm—Oblon, Spivak, McClelland, Maier & Neustadt, P.C.

(57) ABSTRACT

A rear mixer ejector of a turbomachine for a supersonic aircraft has an ejector casing of rectangular cross-section fitted with movable flaps defining a variable geometry exhaust nozzle, and cold air mixing devices mounted on the casing side walls upstream of the nozzle. The mixing devices comprise a plurality of U-section chutes extending into the casing from apertures in the casing side walls, each chute being formed by a pair of lateral walls and a transverse wall disposed between them. The chutes are adjustable between a deployed position and an inoperative position, either by pivoting the chutes about axes at the downstream edges of the apertures or by pivoting only the transverse walls about the upstream edges of the apertures. In each case the lateral walls of the chutes remain in the gas flow path through the casing, parallel to the casing axis, in both the deployed and the inoperative positions, and the transverse walls are parallel to the casing axis in the inoperative position.

2 Claims, 3 Drawing Sheets

REAR MIXER EJECTOR FOR A TURBOMACHINE

BACKGROUND OF THE INVENTION

1. Field of the Invention

The invention relates to a rear mixer ejector for a turbomachine intended for propelling supersonic civil aircraft.

The noise level caused by the exhaust gases from the nozzle of a turbojet engine increases as the gas ejection speed increases. This noise, known as jet noise, is very noticeable in the case of a single flow, or straight, turbojet engine.

In order to reduce the noise level of jet aircraft near airports and at low and medium heights their engines must be provided with means for attenuating exhaust gas noise, and an effective technique for reducing jet noise is to mix the primary highvelocity hot gas flow from the gas generator, or combustor, of the turbojet engine with low-velocity cold air delivered from a secondary flow path outside the primary flow path in order to produce a relatively uniform mixture of intermediate velocity at the exhaust nozzle exit.

2. Summary of the Prior Art

Various fixed means for achieving this mixture are known, such as organ pipe devices, daisy devices or lobed devices. However, they are permanently present in the flow path of the hot gases leaving the combustor, and this impairs the performance of the engine since it leads to excessive fuel consumption in some flight conditions.

The ejection nozzle of supersonic aircraft has a variable configuration which is adaptable to flight conditions and aircraft speed. Reducing noise from the jet engines of such aircraft is unnecessary during supersonic cruising, descent, approach and landing, since the aircraft flies at a very high altitude when cruising at supersonic speeds, and engine speeds are low during the other flight regimes. During take-off and climbing, however, attenuation of the engine noise is particularly necessary, and temporary cold air feeds must therefore be available for mixing with the hot gases from the combustor in order to lower the hot gas temperature and thus reduce the speed of the gases ejected from the nozzle.

U.S. Pat. Nos. 5,154,052 and 5,291,672 disclose rear mixer ejectors for supersonic aircraft engines wherein the ejector casing has a rectangular cross-section in which the opposed top and bottom walls are provided with variable-geometry convergent-divergent flaps and pivotable mixing devices comprising a number of spaced-apart chutes movable between a deployed position, in which they channel cold air from the outside into the hot gas flow path, and an inoperative retracted position. The chutes each comprise two spaced-apart lateral walls which are of triangular shape and which are interconnected along one of their edges by a transverse wall forming a chute bottom which extends inwards into the hot gas flow path and in the downstream direction when the chutes are in the deployed position. In the inoperative position the chutes are retracted into the thickness of the casing and the chute bottoms close the air inlet apertures which are provided in the casing walls in correspondence with the chutes. This arrangement makes it necessary to increase the casing wall thickness, and results in an undesirable increase in aerodynamic drag and excessive fuel consumption.

SUMMARY OF THE INVENTION

It is an object of the invention to overcome this problem and to provide a rear mixer ejector for a supersonic aircraft engine wherein the mixing devices remain in the hot gas flow path of the turbomachine when in the inoperative position but without causing excessive losses.

To this end, according to the invention there is provided a rear mixer ejector of a turbomachine for supersonic aircraft, comprising a casing having opposed top and bottom walls and opposed side walls defining a substantially rectangular cross-section, said casing having a central axis and defining a flow path for the gases exhausted from the gas generator of said turbomachine, movable variable geometry flaps in said top and bottom walls of said casing forming a variable geometry gas exhaust nozzle, air inlet apertures provided in said side walls of said casing upstream of said exhaust nozzle, and mixer means which are mounted on said side walls adjacent said air inlet apertures and are adjustable between an inoperative position and a deployed position wherein said mixer means are operative to channel into said gas flow path cold air which enters said casing from outside through said air inlet apertures, said mixer means on each of said side walls comprising a plurality of spaced apart chutes each mounted adjacent a respective air inlet aperture, each chute comprising two spaced lateral walls of substantially triangular shape and a transverse wall extending between said lateral walls to define a chute bottom which extends angularly into said gas flow path in the downstream direction when said mixer means are in the deployed position, said chutes on each of said side walls being of unitary construction and mounted to pivot between said inoperative position and said deployed position about an axis which is disposed at the downstream edge of the respective air inlet apertures and remote from said chute bottoms, whereby said chutes are disposed in said gas flow path in both said inoperative and deployed positions with said chute bottoms extending parallel to said central axis in said inoperative position, means being provided for closing said air inlet apertures when said chutes are in said inoperative position.

Preferably, said means for closing said air inlet apertures comprises a door which is disposed outside said gas flow path and which is mounted to pivot about said axis at said downstream edge of said air inlet apertures, said door pivoting to close said air inlet apertures when said chutes pivot to said inoperative position.

As an equivalent variant, the invention also provides a rear mixer ejector of a turbomachine for a supersonic aircraft, comprising a casing having opposed top and bottom walls and opposed side walls defining a substantially rectangular cross-section, said casing having a central axis and defining a flow path for the gases exhausted from the gas generator of said turbomachine, movable variable geometry flaps in said top and bottom walls of said casing forming a variable geometry gas exhaust nozzle, air inlet apertures provided in said side walls of said casing upstream of said exhaust nozzle, and mixer means which are mounted on said side walls adjacent said air inlet apertures and are adjustable between an inoperative position and a deployed position wherein said mixer means are operative to channel into said gas flow path cold air which enters said casing from outside through said air inlet apertures, said mixer means on each of said side walls comprising a plurality of spaced apart chutes each mounted adjacent a respective air inlet aperture, each chute comprising two spaced lateral walls of substantially triangular shape and a transverse wall which extends between said lateral walls and defines a chute bottom extending angularly into said gas flow path in the downstream direction when said mixer means are in the deployed position, said lateral walls of each chute being fixed to the respective side wall of said casing adjacent the respective air inlet aperture and projecting permanently into said gas flow path, and said transverse wall of each chute being in the form of a flap which is hinged at the upstream edge of said respective air inlet aperture and is pivotable between the deployed position, in which said flap defines the chute bottom extending angularly into said gas flow path, and the inoperative position, in which said flap extends parallel to said central axis and closes said air inlet aperture.

Thus, in both constructions in accordance with the invention the mixing means remain permanently in the hot gas flow path of the turbomachine. However, when the chutes are in the inoperative position their constituent walls are all parallel to the casing axis and are thus disposed in the flow path so as not to cause excessive disturbance of the exhaust gas flow.

Other advantages and preferred features of the invention will become apparent from the following description of the preferred embodiments with reference to the accompanying drawings.

DESCRIPTION OF THE PREFERRED EMBODIMENTS

Figure 1:
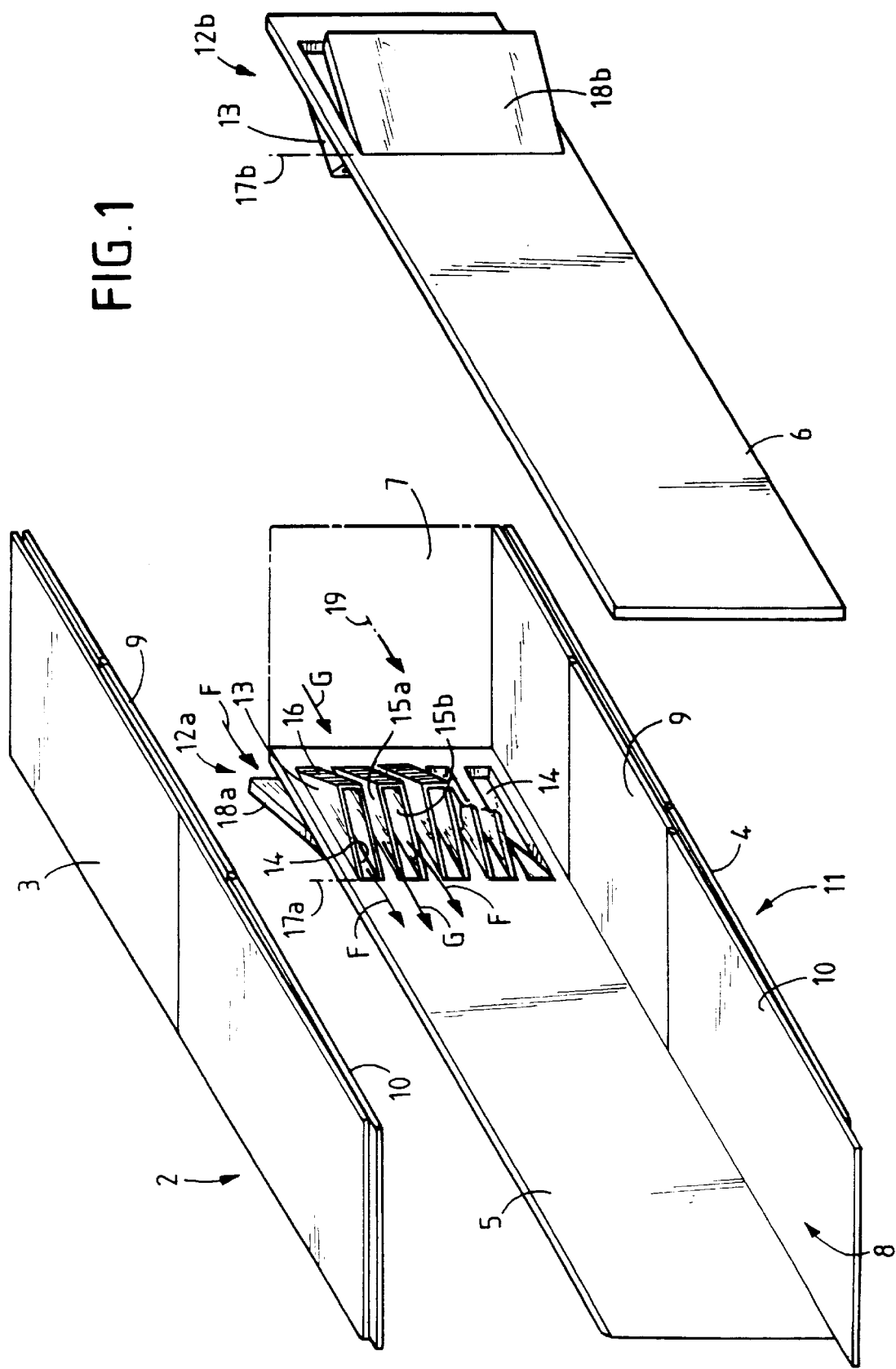
FIG. 1 is an exploded perspective view of a first embodiment of a rear mixer ejector in accordance with the invention, showing the unit in the position adopted for take-off and climbing.

The drawings show a rear mixer ejector unit for a supersonic aircraft turbojet engine, the unit comprising a casing 2 having a rectangular cross-section defined internally by a top wall 3, a bottom wall 4 and two side walls 5, 6. The reference 7 represents the intake opening for the hot gas flow from the gas generator of the engine, and the reference 8 denotes the outlet of the exhaust nozzle 11 defined by the casing. The top and bottom walls 3, 4 are provided with movable flaps 9, 10 which enable the exhaust nozzle 11 to be given a variable-geometry configuration, more particularly a convergent-divergent configuration (FIGS. 2 and 4), for supersonic flight regimes.

The side walls 5, 6 each have, downstream of the intake opening 7 and upstream of the nozzle 11, a mixing device 12a, 12b which serves to introduce a cold air flow F from outside the casing 2 into the flow path G of hot gases entering the casing from the gas generator during take-off and climbing flight regimes.

Each mixing device 12a, 12b comprises a plurality of spaced-apart chutes 13 each disposed adjacent a respective oblong aperture 14 provided in the corresponding side wall of the casing 2. The side walls 5, 6 are therefore formed with a plurality of vertically spaced-apart apertures 14. Each chute 13 is formed by two spaced-apart lateral walls 15a, 15b which are substantially triangular in shape, and a transverse wall 16 extending between the two lateral walls for forming a chute bottom.

Figure 2:
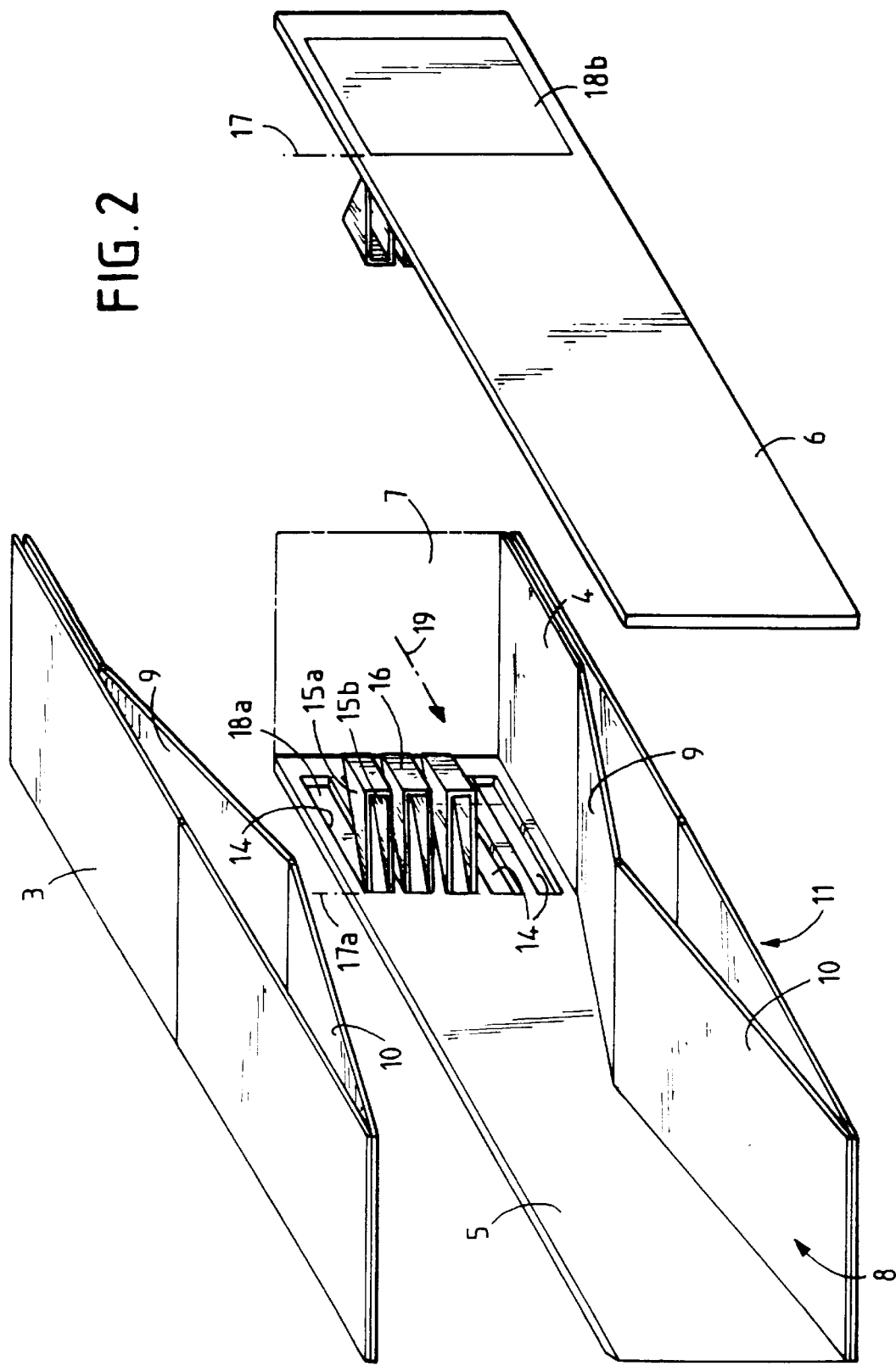
FIG. 2 is a view similar to FIG. 1, but showing the unit in the position adopted for supersonic flight.

In the first embodiment shown in FIGS. 1 and 2 each chute 13 is of unitary construction and the transverse wall 16 interconnects those edges of the lateral walls 15a, 15b which are remote from a vertical pivot axis 17a, 17b of the chute 13 disposed in the corresponding side wall 5 or 6 near the downstream edge of the apertures 14. The air taken in through the apertures 14 is captured from outside the casing by two doors 18a, 18b pivotable about the axes 17a, 17b respectively. The doors 18a, 18b are preferably rigidly secured to the chutes 13 so that their rotation by drive elements causes simultaneous pivoting of the chutes around the pivot axes 17a, 17b.

The chutes 13 and the doors 18a, 18b can take up either of two end positions depending on flight conditions. In a first, or deployed, position shown in FIG. 1 the doors 18a, 18b extend angularly outwardly from the side walls 5, 6 in the upstream direction, and the chutes 13 are pivoted against the inside of the side walls 5 and 6 so that the chute bottoms 16 extend from the upstream edge of the apertures 14 angularly inwards towards the interior of the flow path in the downstream direction. This deployed position is used during take-off and climbing flight regimes. Cold air streams are therefore interleaved with the hot air streams flowing through the spaces separating the chutes 13 upstream of the nozzle 11, and these cold air streams mix with the hot gas flow G from the gas generator in order to reduce the hot gas flow temperature and, therefore, the engine noise level produced by the ejector.

FIG. 2 shows the position of the chutes 13 and doors 18a, 18b in the second, or inoperative, position adopted for other flight regimes. In this position the doors 18a, 18b are folded against the outside of the side walls 5, 6 and close the apertures 14, and the chutes 13 have pivoted around the axes 17a, 17b so that the chute bottoms 16 are disposed parallel to the central axis 19 of the casing 2, i.e. parallel to the insides of the side walls 5, 6. The lateral walls 15a, 15b remain in the gas flow path and are disposed in planes parallel to the central axis 19. The chute walls 15a, 15b, 16 are sufficiently thin and streamlined to minimise drag losses in the hot gas flow.

In the first embodiment just described the doors 18a, 18b are pivotable around the pivot axes 17a, 17b of the chutes 13. However, if preferred, the doors 18a, 18b may be arranged to slide on or in the casing side walls 5, 6, in which case the mixing devices 12a, 12b will have independent drive elements for rotating them about the axes 17a, 17b.

Figure 3:
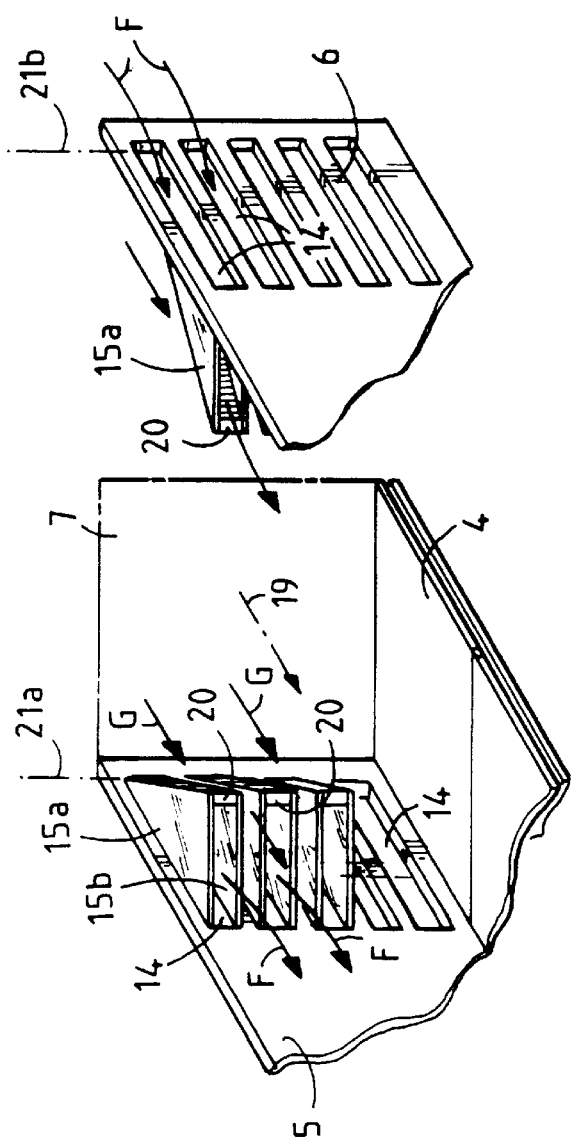
FIG. 3 is a partial view similar to FIG. 1 but showing a second embodiment of a rear mixer ejector unit in accordance with the invention in the take-off and climbing position; and, FIG. 4 is a view similar to FIG. 3 showing the unit in the position adopted for supersonic flight.
Figure 4:
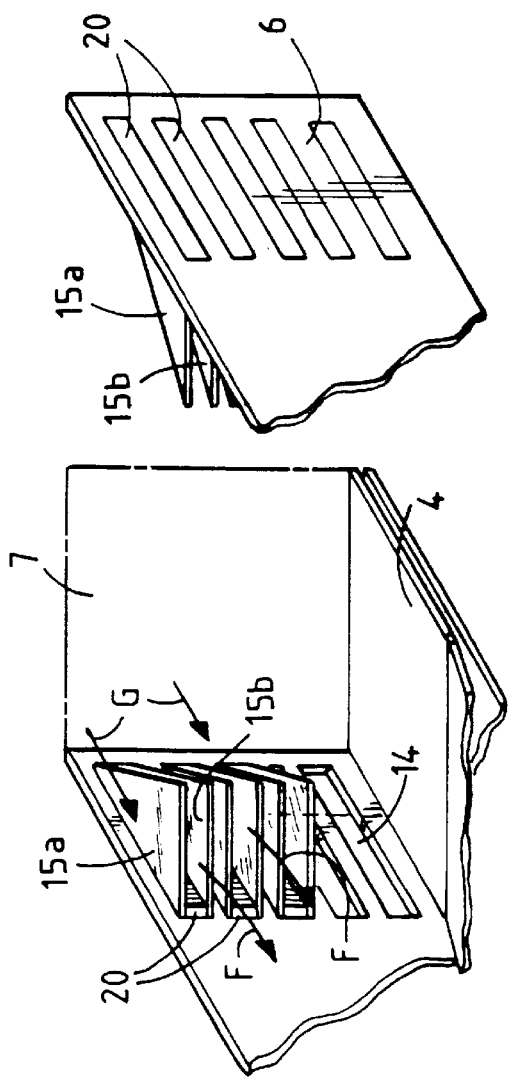

In the second embodiment of the invention shown in FIGS. 3 and 4 the lateral walls 15a, 15b of each chute 13 are fixed to the inner face of the respective side walls 5 or 6 along the longitudinal edges of the respective aperture 14, and the transverse wall 16 which is fixed to the lateral walls in the first embodiment is replaced by a flap 20 which is pivotally mounted at the upstream edge of the aperture 14 so that it can pivot about a vertical axis 21a, 21b between two end positions, namely a deployed position in which the flap 20 extends angularly inwards in the downstream direction and is disposed along the upstream inner edges of the lateral walls 15a, 15b, and an inoperative position in which the flap 20 lies in the plane of the side wall 5, 6 and closes the aperture 14. In the deployed position shown in FIG. 3 the flaps 20 are disposed in the hot gas flow path G and the apertures 14 in the casing side walls 5, 6 are open. Cold air F can thus enter the apertures and flow through the chutes 13, and the hot gases flowing in the spaces between the chutes mix with the cold air downstream of the chutes 13 to slow down the flow through the nozzle 11.

In supersonic flight regimes the mixing action of the mixing devices 12a, 12b is not required, and the flaps 20 are pivoted around the vertical axes 21a, 21b into their inoperative position in which they close the apertures 14 and are received in the thickness of the casing side walls 5, 6. Only the lateral walls 15a, 15b of the chutes 13 then remain in the hot gas flow path G, and since these are thin and in planes parallel to the axis 19 they do not impair the hot gas flow. It will be noted that the doors 18a, 18b of the first embodiment are not present in the second embodiment.

As will be appreciated from the foregoing description, the invention helps to reduce engine noise during take-off and climbing, and to reduce very considerably the transverse dimensions of the casing 2 compared with the known mixer ejectors described earlier.

We claim:

1. A rear mixer ejector of a turbomachine for supersonic aircraft, comprising a casing having opposed top and bottom walls and opposed side walls defining a substantially rectangular cross-section, said casing having a central axis and defining a flow path for the gases exhausted from the gas generator of said turbomachine, movable variable geometry flaps in said top and bottom walls of said casing forming a variable geometry gas exhaust nozzle, air inlet apertures provided in said side walls of said casing upstream of said exhaust nozzle, and mixer means which are mounted on said side walls adjacent said air inlet apertures and are adjustable between an inoperative position and a deployed position wherein said mixer means are operative to channel into said gas flow path cold air which enters said casing from outside through said air inlet apertures, said mixer means on each of said side walls comprising a plurality of spaced apart chutes each mounted adjacent a respective air inlet aperture, each chute comprising two spaced lateral walls of substantially triangular shape and a transverse wall extending between said lateral walls to define a chute bottom which extends angularly into said gas flow path in the downstream direction when said mixer means are in the deployed position, said chutes on each of said side walls being of unitary construction and mounted to pivot between said inoperative position and said deployed position about an axis which is disposed at the downstream edge of the respective air inlet apertures and remote from said chute bottoms, whereby said chutes are disposed in said gas flow path in both said inoperative and deployed positions with said chute bottoms extending parallel to said central axis in said inoperative position, means being provided for closing said air inlet apertures when said chutes are in said inoperative position.

2. A rear mixer ejector according to claim 1, wherein said means for closing said air inlet apertures comprises a door which is disposed outside said gas flow path and which is mounted to pivot about said axis at said downstream edge of said air inlet apertures, said door pivoting to close said air inlet apertures when said chutes pivot to said inoperative position.

* * * * *